United States Patent
Stolze et al.

(10) Patent No.: US 12,361,022 B2
(45) Date of Patent: Jul. 15, 2025

(54) LOADING DATA IN A TARGET DATABASE SYSTEM USING DIFFERENT SYNCHRONIZATION PROGRAMS

(71) Applicant: International Business Machines Corporation, Armonk, NY (US)

(72) Inventors: Knut Stolze, Hummelshain (DE); Luis Eduardo Oliveira Lizardo, Boeblingen (DE); Reinhold Geiselhart, Rottenburg-Ergenzingen (DE); Felix Beier, Haigerloch (DE)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 17/528,589

(22) Filed: Nov. 17, 2021

(65) Prior Publication Data
US 2023/0153327 A1    May 18, 2023

(51) Int. Cl.
*G06F 16/00* (2019.01)
*G06F 16/23* (2019.01)
*G06F 16/27* (2019.01)

(52) U.S. Cl.
CPC ........ *G06F 16/278* (2019.01); *G06F 16/2379* (2019.01)

(58) Field of Classification Search
CPC .. G06F 16/2358; G06F 16/27; G06F 16/2282; G06F 16/24554; G06F 16/2458;
(Continued)

(56) References Cited

U.S. PATENT DOCUMENTS

| | | | |
|---|---|---|---|
| 10,902,015 B2 | 1/2021 | Bourbonnais | |
| 2007/0130226 A1* | 6/2007 | Banerjee | G06F 16/217 |

(Continued)

FOREIGN PATENT DOCUMENTS

| | | |
|---|---|---|
| EP | 2474909 A2 | 7/2012 |
| EP | 2829968 A1 | 1/2015 |

OTHER PUBLICATIONS

"Poor Men's Multi-Version Concurrency Control (MVCC)", Github, downloaded from the Internet on Oct. 4, 2021, 11 pages, <https://pages.github.ibm.com/Everest/IDAA-Server/#/concepts/mvcc>.
(Continued)

*Primary Examiner* — Shyue Jiunn Hwa
(74) *Attorney, Agent, or Firm* — Scott Dobson

(57) ABSTRACT

A computer implemented method includes identifying a query view of a target database system enabling access to a first source table stored in a first target table, executing a load program for a current version of a first source partition of the first source table, wherein executing the load program includes loading the first source partition in a second load target partition of the first target table, changing the query view to select records of the first target table, executing an update program for assigning records of the first replication target partition to the first load target partition, selecting a mode of operation for a replication program based on determining whether the execution of the update program is finished, executing the replication program in accordance with the selected mode of operation, and changing the query view to further select the records of the first replication target partition.

20 Claims, 11 Drawing Sheets

(58) Field of Classification Search
CPC .... G06F 16/252; G06F 16/258; G06F 16/273;
G06F 16/20; G06F 16/21; G06F 16/284;
G06F 16/951; G06F 3/0481; G06F
3/0484; G06F 7/00; G06F 16/26; G06F
16/217; G06F 16/2365; G06F 16/2423;
G06F 16/24565; G06F 1/00; G06F 3/00;
G06F 16/2477; G06F 16/22; G06F 16/23;
G06F 13/00; G06F 11/00; G06F 8/00
See application file for complete search history.

(56) References Cited

U.S. PATENT DOCUMENTS

| | | | |
|---|---|---|---|
| 2007/0226203 A1* | 9/2007 | Adya | G06F 16/2445 |
| 2011/0320419 A1* | 12/2011 | Johnston | G06F 16/219 |
| | | | 707/703 |
| 2020/0034365 A1 | 1/2020 | Martin | |
| 2020/0151195 A1 | 5/2020 | Brodt | |
| 2022/0284033 A1* | 9/2022 | Stolze | G06F 16/27 |
| 2023/0028333 A1* | 1/2023 | Simon | G06F 3/0485 |

OTHER PUBLICATIONS

Authors et al.: Disclosed Anonymously, "A Log Merge Method in Active-Active Sites", An IP.com Prior Art Database Technical Disclosure, IP.com No. IPCOM000254082D, IP.com Electronic Publication Date: May 31, 2018, 6 pages.

Authors et. al.: Disclosed Anonymously, "Avoiding Physical Deletes for Rows Inserted or Updated in the Same Micro Batch of Replication", An IP.com Prior Art Database Technical Disclosure, IP.com No. IPCOM000264465D, IP.com Electronic Publication Date: Dec. 21, 2020, 3 pages.

"Patent Cooperation Treaty PCT Notification of Transmittal of the International Search Report and the Written Opinion of the International Searching Authority, or the Declaration", Applicant's file reference P201910293PCT01, International application No. PCT/EP2022/082003, International filing date Nov. 15, 2022 (Nov. 15, 2022), Date of Mailing Mar. 16, 2023 (Mar. 16, 2023), 10 pages.

Response to communication pursuant to Rule 161(1) and 162 EPC dated Dec. 2, 2024, Application No. 22817986.7, IBM Patent Reference, P201910293EP01, 4 p. .

* cited by examiner

LOADING DATA IN A TARGET DATABASE SYSTEM USING DIFFERENT SYNCHRONIZATION PROGRAMS

BACKGROUND

The present invention relates to the field of digital computer systems, and more specifically, to a method for loading data in a target database system using different synchronization programs.

Data loading is one of the most frequent operations performed in a database system. Improving the data loading may thus improve the overall performance of the database system. However, controlling the time required to perform such data loading may be a challenging task.

SUMMARY

Various embodiments provide a method for loading data in a target database system using different synchronization programs, computer system and computer program product as described by the subject matter of the independent claims. Advantageous embodiments are described in the dependent claims. Embodiments of the present invention can be freely combined with each other if they are not mutually exclusive.

As disclosed herein, a computer implemented method for data synchronization between a source database system and a target database system includes identifying a query view of the target database system enabling access to a last version of a first source table that is stored in a first target table, the query view being configured to select records of the first target table, the first target table having a first load target partition with a first load partition ID and a first replication target partition with a first replication partition ID, executing a load program for a current version of a first source partition of the first source table, wherein executing the load program includes loading the first source partition in a second load target partition of the first target table, the second load target partition having a second load partition ID, changing the query view to select records of the first target table having the second load partition ID, executing an update program for assigning records of the first replication target partition to the first load target partition, in response to receiving a replication request of one or more current records of the first source partition of the first source table, determining whether the execution of the update program is finished, selecting a mode of operation for a replication program based, at least in part, on determining whether the execution of the update program is finished, executing the replication program in accordance with the selected mode of operation, and changing the query view to further select the records of the first replication target partition. A computer program product and computer system corresponding to the method are also disclosed.

DETAILED DESCRIPTION

Figure 1:
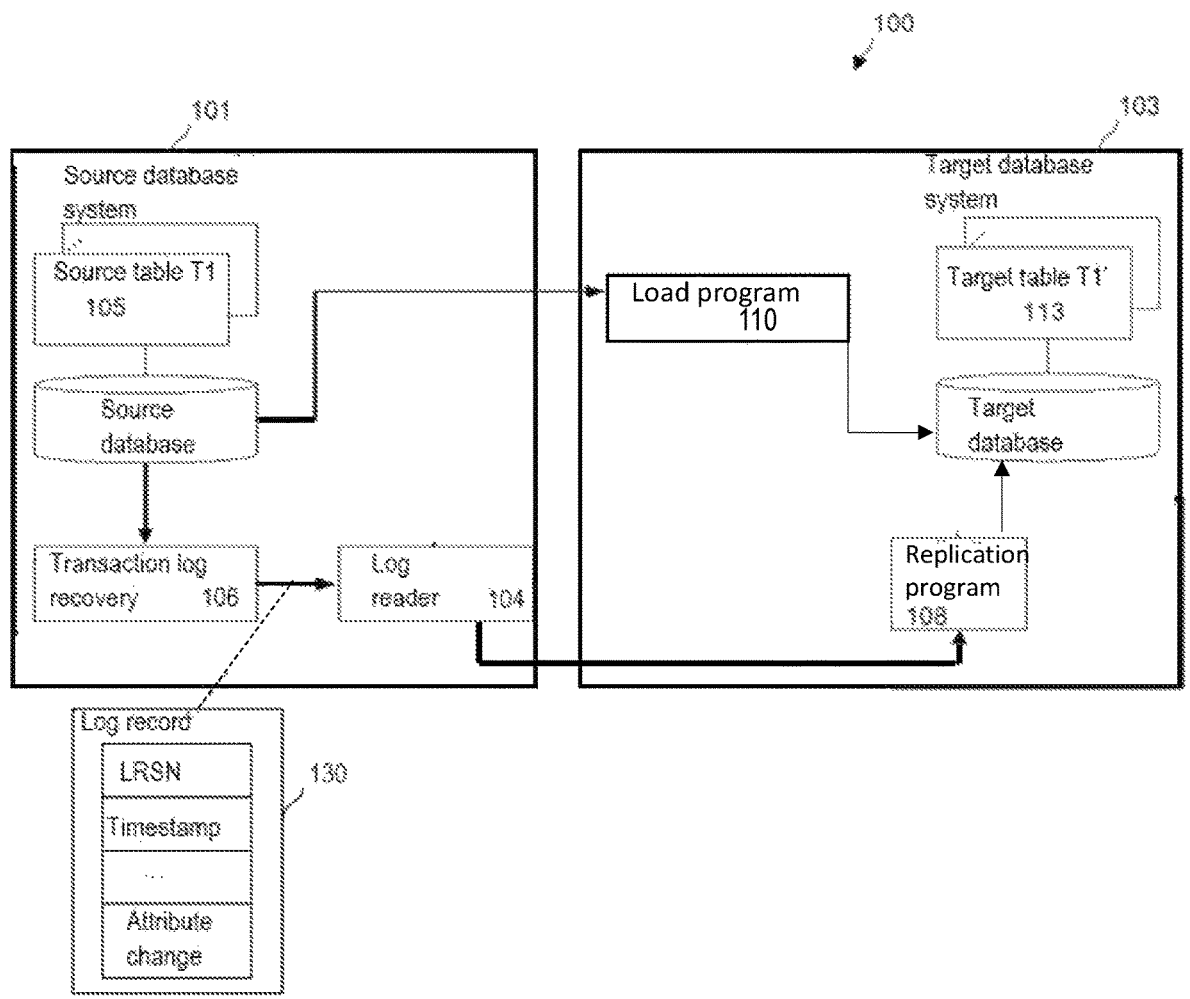
FIG. 1 depicts a data analysis system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A data analysis system comprises a source database system and a target database system. The data analysis system may, for example, be a data warehousing system or master data management system. The data analysis system may enable data warehousing or master data management or another technique that uses a source and target database systems, wherein the target database system comprises a target database that is configured to receive/comprise a copy of a content of a corresponding source database of the source database system. The source database system may, for example, be a transactional engine and the target database system may be an analytical engine. For example, the source database system may be an online transaction processing (OLTP) system and the target database system may be an online analytical processing (OLAP) system. The source database system may comprise a source dataset and the target database system may comprise a target dataset. The source dataset may be part of a source database and the target dataset may be part of a target database. The source and target datasets may be stored in a same or different format. The formats may differ in encryption, compression, row-oriented vs. column-oriented storage, etc. For example, the source dataset may be stored in a row-oriented format and the target dataset may be stored in a column-oriented format. In other terms, the target dataset may be stored by column rather than by row. The content of the source dataset may be changed by one or more database transactions.

The source table may comprise one or more partitions $PO_1 \ldots SP_N$, where $N \geq 1$, named source partitions. The source table may be partitioned horizontally so that complete rows may be placed into a specific partition. Each source partition may comprise its respective set of rows of the source table. Each source partition of the source table may have an identifier (ID), named source partition ID. The same type of source partition IDs may be used for the source partitions. The source partitions $SP_1 \ldots SP_N$ may, for example, have source partition IDs $ID_1^S \ldots ID_N^S$ respectively. The target table may comprise M partitions $TP_1 \ldots TP_M$, named target partitions. Each target partition of the target table may have an ID, named target partition ID. The target partitions may have different types of partition IDs depending on the synchronization program that copied data in said target partitions. The records (also referred to as rows) that belong to the same partition have the same partition ID of said partition e.g., each record of a given source partition have a dedicated attribute or column that stores the same source partition ID of the given source partition. The data analysis system may be configured to synchronize the content of the source table of the source database system with the corresponding target table of the target database system. After synchronization, the records of each source partition of the source table may, for example, be part of two target partitions having different target partition IDs. For that, multiple synchronization programs may be used. The synchronization programs may comprise a load program (which may be referred to as partial reload program) and a replication program. The two programs may differ in the amount and frequency of copying data from the source table to the target table. The load program may copy the whole content of source partitions of the source table into corresponding target partitions of the target table. The load program may repeatedly be executed to repeat this process of copying/loading of the whole source table e.g., this may enable to regularly update the target with new versions of the source table. The load program may use the source partition ID of each row from the source table and maps it to a different, new, and unique target partition ID in the target table, named load partition ID. The load program may use a mapping between source partition IDs and load partition IDs to assign rows of the source table to respective target partitions. Due to the different load partition IDs, it may be easily possible to distinguish the rows loaded by the different executions of the load program. The replication program may replicate individual changes from the source table to the target table by inspecting a transaction log of the source database system. The replication program may apply a 1:1 of the partition IDs mapping, e.g., the source partition ID $ID_i^S$ (i=1, . . . N) is mapped to the replication partition ID, $ID_i^R$, wherein $ID_i^R$ may or may not be equal to $ID_i^S$. In case $ID_i^R=ID_i^S$, the replication program may not have to calculate or derive a new ID for the replication target partition. Thus, whenever the replication program is executed for a given source partition it may copy records of the source partition to the same target partition. This may be referred to as the default mode of operation of the replication program. The replication program may copy changed records of a source partition into a same replication target partition having a replication partition ID; in other words, the rows that have the same source partition ID may be replicated to the same partition, even if they are replicated multiple times.

However, to avoid inconsistent data in the target table, the load program may handle replicated rows by the replication program specifically for performing a new load of data, which may be accomplished by executing an update program (e.g., an UPDATE SQL statement) to assign the last assigned load partition ID of the last bulk load for the replication target partition of the target table.

Hence, the synchronization between the source table and the target table may involve execution of three programs: the replication program, the load program, and the update program. This may result in content of at least one source partition of the source table being stored on two target partitions having a load partition ID and replication partition ID respectively. The execution of the load program may load the whole source partition to the target partition having that load partition ID and may subsequently be followed by the execution of the replication program on that source partition to replicate records of the source partition to the target partition having the replication partition ID.

Thus, at a current point of time $t_0$, the records of each source partition $SP_1 \ldots SP_N$ may be stored in at least one target partition of the target partitions. For example, each source partition of K source partitions $SP_1 \ldots SP_K$, where K≤N, may be associated with two target partitions having the replication partition ID and load partition ID respectively, meaning that the execution of the load program followed by the execution of the replication program is performed for these K source partitions. E.g., each source partition $SP_i$ (where i=1, . . . K) is associated with a pair of a replication® and load (L) target partition $(TP_{1,v_0}^R, TP_{1,v_0}^L)$ of the M target partitions $TP_1 \ldots TP_M$. The lower index i indicates the source partition associated with the target partition, and $v_0$ indicates the current content's version of the target partition. Thus, the target table may comprise the K pairs $(TP_{1,v_0}^R, TP_{1,v_0}^L)$ in addition to M−2K (=N−K) individual load target partitions (to be noted that if K=N, then M=2K). In other words, current content of the K source partitions of the source table is stored in respective pairs of target partitions $(TP_{1,v_0}^L, TP_{1,v_0}^L)$ meaning that records of each of the K source partitions have been copied to the target table by the load and replication programs, while the current content of the remaining N−K source partitions are stored in respective N−K load target partitions, meaning that only the load program has been executed for these N−K source partitions. Thus, at the current point of time $t_0$, the M target partitions comprise N load target partitions and K replication target partitions. Each of the N load target partitions has a unique load partition ID, $ID_{1,v_0}^L$ that reflects the current point of time $t_0$. Each of the of the K replication target partitions has a replication partition ID, $ID_i^R$ which is independent of time (the version index $v_0$ is missing) e.g., if records of the source partition $SP_i$ are replicated using the replication program at different point of times e.g., $t_{-1}$ and $t_0$ (e.g., because the source partition has changed at $t_{-1}$ and $t_0$), then the same replication target partition ID, $ID_i^R$ is used for $t_{-1}$ and $t_0$. The access to the target table may be performed by querying a query view representing the current content of the target table. The query view represents data of the target table that can be accessed e.g., it indicates the current data at current point of time $t_0$. In particular, the query view may represent the last version of the target table by using selections on the load partition IDs and replication partition IDs.

However, at a later point of time $t_1$, the load program may be executed again to load the source partitions $SP_1 \ldots SP_N$ of the source table into respective load target partitions of the target table $TP_{1,v_1}^L, TP_{2,v_1}^L \ldots TP_{N,v_1}^L$. This may change the current content of the target table. That is, the new content of the source table which has version $v_i$ is only present in the load target partitions of the target table $TP_{1,v_1}^L, TP_{2,v_1}^L \ldots TP_{N,v_1}^L$. In this case, the query view may be updated or changed to include only the N new load target partitions and exclude the content of version $v_0$. In addition, the update program may be executed for the replication target partitions $TP_{1,v_0}^R, TP_{2,v_0}^R \ldots TP_{K,v_0}^R$ associated with the source partitions $SP_1 \ldots SP_K$ e.g., for each source partition $SP_i$ (where i=1, . . . K) the update program may change the replication partition ID, $ID_i^R$ of the replication target partition $TP_{i,v_0}^R$ to the load partition ID, $ID_{i,v_0}^L$ of the load target partition $TP_{i,v_0}^L$ associated with $TP_{1,v_0}^R$. However, after loading the source partitions, the replication program may need to be executed (for example, in embodiments where some records have changed in one or more source partitions). In this case, there may be a technical challenge to optimize the execution of the update program and the replication program. The present subject matter may enable execution of the replication program based on evolution of the execution of the update program by switching between the default mode of operation and another mode (second mode) of operation of the replication program. This may balance the access to the correct version of data in the target table and the improved access speed to data.

For example, after the execution of the load program for that point of time $t_1$ and in case one or more records (named changed records) of one or more source partitions $SP_1 \ldots SP_J$ of the K source partitions $SP_1 \ldots SP_K$, where $1 \leq J \leq K$, have been changed or inserted in the source partitions, the replication program may be executed for these J source partitions $SP_1 \ldots SP_J$. For that, it may be determined whether the execution of the update program is finished. The end of the update program may result in the K replication target partitions $TP_{1,v_0}^R \ldots TP_{K,v_0}^R$ becoming empty. In case the execution of the program is ended, the replication program may be executed in accordance with the default mode of operation for copying the changed records of the source partitions $SP_1 \ldots SP_J$ into respective (empty) replication target partitions $TP_{1,v_1}^R \ldots TP_{J,v_1}^R$ having IDs $ID_1^R \ldots ID_J^R$ respectively. The query view may further be updated to include the J replication target partitions $TP_{1,v_1}^R, \ldots TP_{J,v_1}^R$ in addition to said N new load target partitions. However, if the update program is not finished, the replication program may be executed for the J source partitions $SP_1 \ldots SP_J$ in accordance with the second mode of operation to copy the changed records of the J source partitions $SP_1 \ldots SP_J$ in the respective load target partitions $TP_{1,v_1}^L, \ldots TP_{J,v_1}^L$. This copy may be performed directly or indirectly as described herein.

The present subject matter may make already completely loaded partitions visible while ensuring correct results for concurrently running queries before and after the partition was completed. The replication latency may be reduced. The present subject matter may thus enable an efficient execution of the synchronization based on the timing of the executions of the above three programs.

According to one embodiment, the execution of the replication program in accordance with the second mode of operation to copy the records of the J source partitions $SP_1 \ldots SP_J$ in the respective load target partitions $TP_{1,v_1}^L, \ldots TP_{J,v_1}^L$ comprises: storing the records in a staging table different from the target table. The query view may be changed to further select the records of the staging table in addition to the N new load target partitions. After the execution of the update program is finished, the records of the staging table may be moved to the load target partitions $TP_{1,v_1}^L, \ldots TP_{J,v_1}^L$.

According to one embodiment, the execution of the replication program in accordance with the second mode of operation to copy the records of the J source partitions $SP_1 \ldots SP_J$ in the respective load target partitions $TP_{1,v_1}^L \ldots TP_{J,v_1}^L$ comprises: implementing a trigger to switch from the default mode of operation of the replication program to the second mode of operation, wherein the trigger comprises an SQL INSTEAD OF trigger, the trigger being activated in response to determining that the update program is not finished. For example, in response to determining that the update program is finished the trigger may be deleted, and in case the execution of the replication program in accordance with the second mode of operation is not completed the execution of the replication program may be completed in accordance with the default mode of operation.

The replication program may be executed against a replication view. In one example, the replication view is separate from the query view. In one example, the replication view may be the query view, such that the replication program is executed against the query view.

According to one embodiment, changing the query view further comprises deselecting the first load partition ID and the first replication partition ID, wherein executing the replication program in accordance with the default mode of operation is performed after queries using the first changed query view have finished.

According to one embodiment, the load partition IDs are larger than the replication partition IDs, wherein the query view comprises a selection of records having an ID smaller than a maximum load partition ID of the load partition IDs.

FIG. 1 is a block diagram of a data analysis system 100 in accordance with an example of the present subject matter. The data analysis system 100 may be configured for data synchronization between a source database system 101 and target database system 103 in accordance with an example of the present subject matter. The source database system 101 may, for example, be an online transaction processing (OLTP) system. The target database system 103 may, for example, be an online analytical processing (OLAP) system. The source database system 101 and the target database system 103 may be connected over a network such as a fixed wireless network, a wireless local area network (WLAN), a wireless wide area network (WWAN) a personal area network (PAN), a virtual private network (VPN), intranet or other suitable network system. For example, the communication between the source database system 101 and the target database system 103 may be performed via a TCP/IP communication layer.

The source database system 101 comprises one or more source tables 105 of a source database and a transaction recovery log 106. Source tables 105 can be relational tables in any number of database systems. The entries or log records of the transaction recovery log 106 describe changes to rows or records of the source tables 105 at the source database system 101. FIG. 1 shows an example content of a log record 130. The log record 130 may comprise a timestamp, log record sequence number (LRSN), and attribute changes. More specifically, the log records in the transaction recovery log 106 may, for example, contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is no new data record, only an old data record. Thus, transaction log records for inserted rows may contain only new column values while transaction log records for deleted rows may contain only old column values. Transaction log records for updated rows may contain the new and old values of all row columns. The order of log records in the transaction recovery log may reflect the order of change operations of the transactions and the order of transaction commit records may reflect the order in which transactions are completed. The type of row operations in transaction log records can, for example, be delete, insert or update.

The source database system 101 comprises a log reader 104. The log reader 104 may read log records of the transaction recovery log 106 provide changed records to the replication program 108 of the target database system 103. The log reader 104 may be configured to perform a log shipping of the transaction recovery log 106 to the target database system 103 based on an incremental update strategy. The shipping may, for example, be performed by sending to the replication program 108 a stream of log records formed from log records of the transaction recovery log 106. The log stream being shipped may, for example, be associated with a stream ID. The stream of log records may, for example, be a stream of merged log records. This may enable an efficient processing of the log records at the target database system. The target database system 103 may comprise a log streaming interface for receiving the log streams from the source database system 101. The replication program 108 may be configured to receive streams of log records via the log streaming interface. The replication program 108 may apply a change indicated in a change record to the target table 113 that corresponds to the source table 105 where the change occurred.

In another example, a bulk load of entire partitions of a source table 105 may be performed. For that, the target database system 103 comprises a load program 110 that receives the partitions to be loaded and load them into the target table 113 that corresponds to the source table 105.

Figure 2:
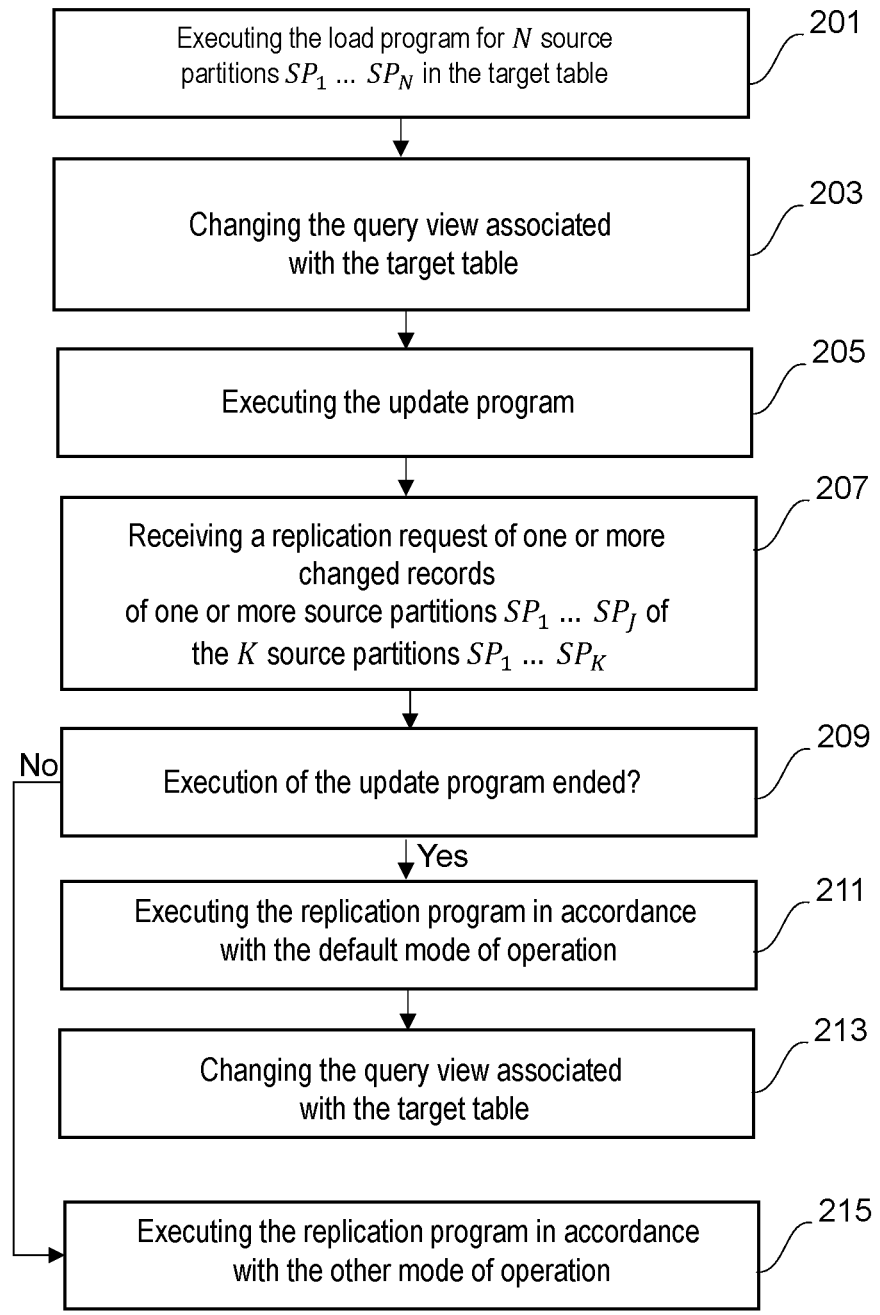
FIG. 2 is a flowchart of a method for loading data in a target database system in accordance with an example of the present subject matter.
Figure 3A:
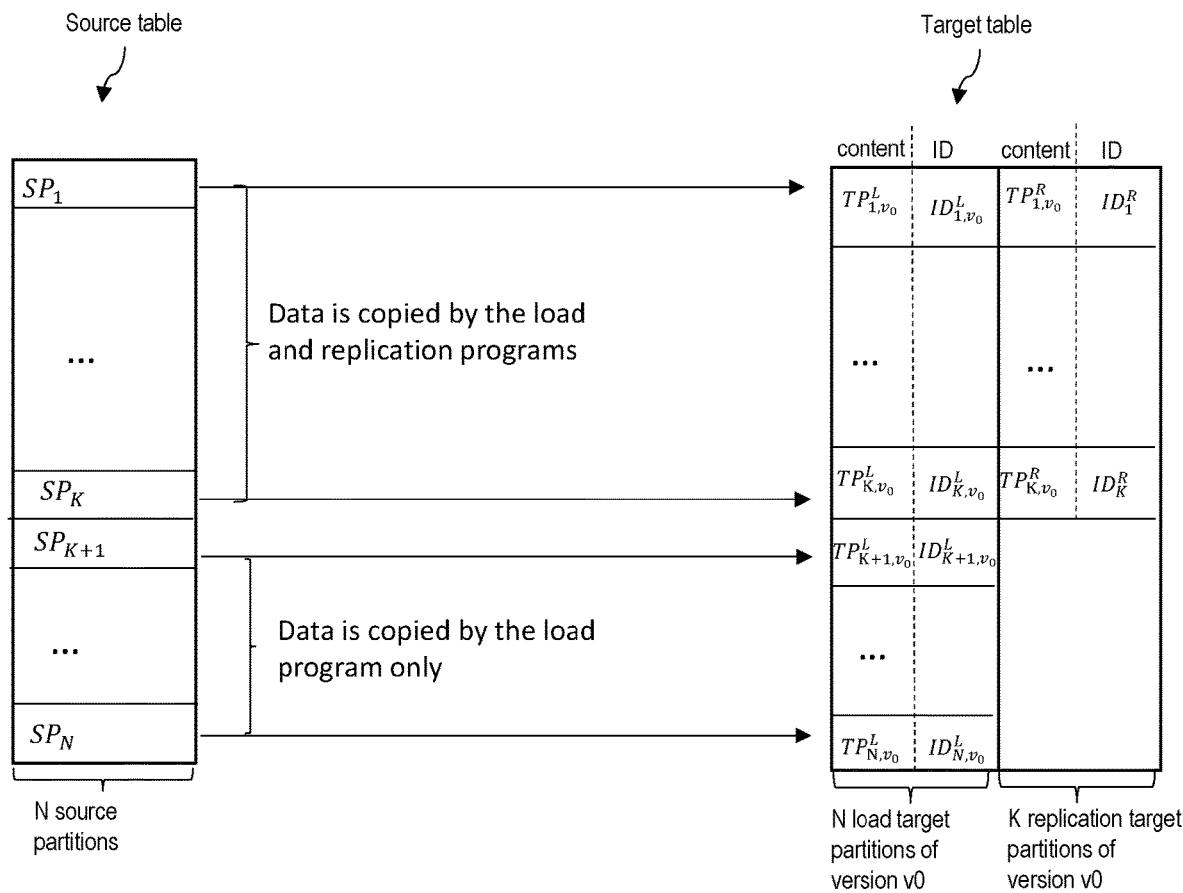
FIGS. 3A to 3G are diagrams illustrating the evolution of the content of the source and target database system in accordance with an example of the present subject matter.

FIG. 2 is a flowchart of a method for data synchronization in a data analysis system. For the purpose of explanation, the method described in FIG. 2 may be implemented in the system illustrated in FIG. 1, but is not limited to this implementation. The method of FIG. 2 may, for example, be performed by the target database system 103. The synchronization may, for example, be described with reference to a source table and corresponding target table. The evolution of the content of the target table is shown in FIGS. 3A-3G. FIG. 3A shows an initial state of the source and target tables. The source table comprises N source partitions $SP_1 \ldots SP_N$. The target table comprises M target partitions. The records of each source partition $SP_1 \ldots SP_N$ may be stored in at least one target partition of the target partitions. For example, each source partition $SP_i$ (where i=1, ... K) of the K source partitions $SP_1 \ldots SP_K$ is associated with a pair of replication (R) and load (L) target partitions $(TP_{i,v_0}^R, TP_{i,v_0}^L)$ of the M target partitions having respectively the IDs, $ID_i^R$ and $ID_{i,v_0}^L$. That is, the records of the K source partitions $SP_1 \ldots SP_K$ were first loaded using the load program 110, and secondly, changed records of the K source partitions $SP_1 \ldots SP_K$ have been replicated using the replication program 108. The remaining N−K source partitions are loaded with the load program 110 only, thus there are only load target partitions for these source partitions. For this reason, the content of the load and replication target partitions is indexed with version $v_0$, indicating a last/recent execution of the load program followed by the execution of the replication program. Assuming for simplification of the description the following inequality between the target partition IDs: $ID_i^R < ID_j^R$ if i<j, $ID_{i,v_0}^L < ID_{j,v_0}^L$ if i<j and $ID_i^R < ID_{j,v_0}^L$, ∀i and j. In this case, the query view may represent all the M(=N+K) target partitions using a WHERE clause as follows:

CREATE OR REPLACE VIEW <view-name>
FROM <target-table> WHERE $ID \leq ID_{N,v_0}^L$      Eq(1), where ID is a partition ID of a target partition.

Figure 3B:
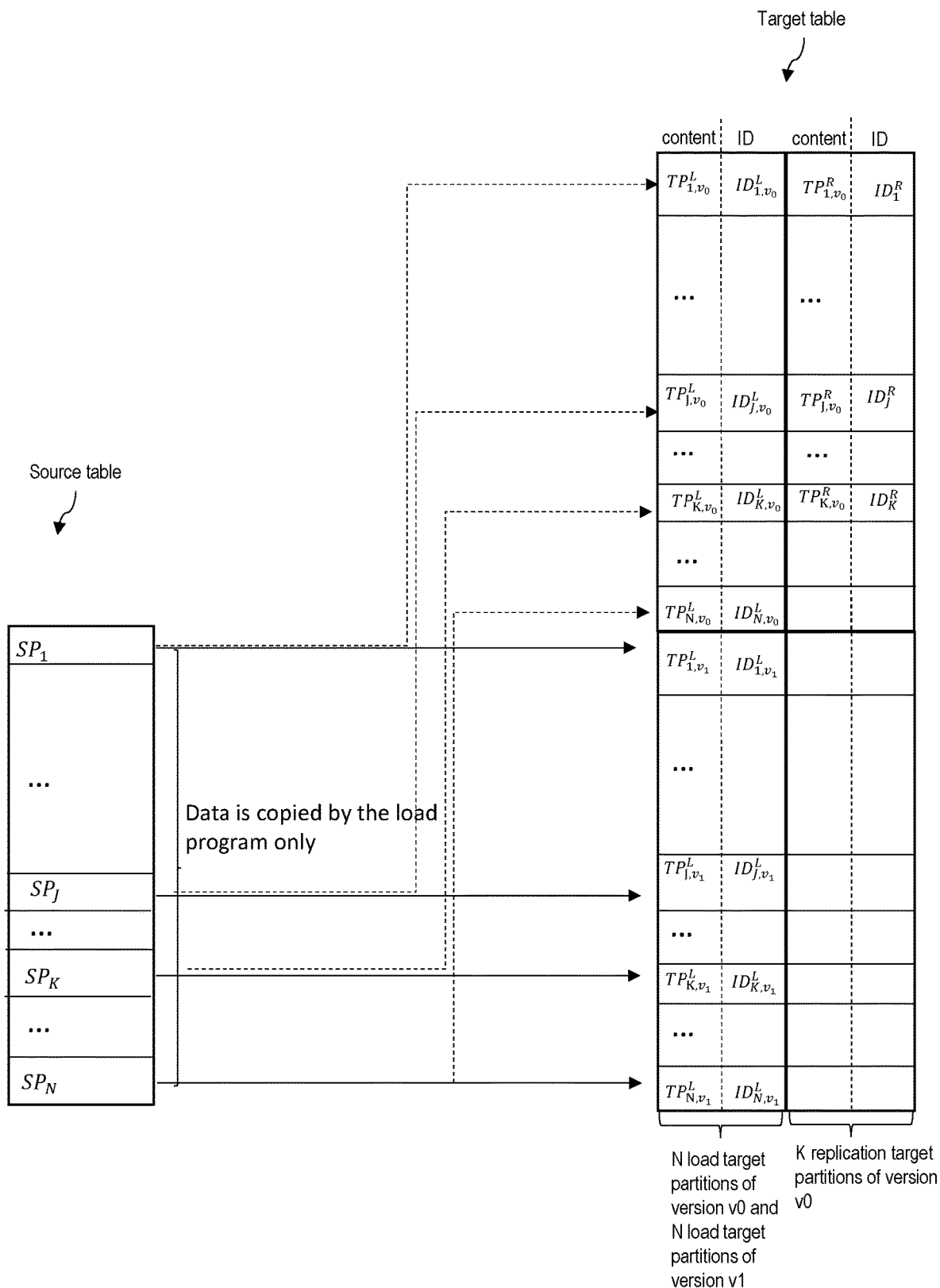

After the initial state indicated in FIG. 3A, the load program may be executed in step 201 for N source partitions $SP_1 \ldots SP_N$. The load program may load the N source partitions $SP_1 \ldots SP_N$ into corresponding new load target partitions $TP_{1,v_1}^L \ldots TP_{N,v_1}^L$ having IDs, $ID_{1,v_1}^L \ldots ID_{N,v_1}^L$ respectively. The new content (also referred to as just reloaded partitions) is indexed with version $v_1$. FIG. 3B shows the resulting target table. FIG. 3B shows the current version of the target table as well as the previous version of the target table. The previous version of the content is linked with dashed arrows to the respective source partitions, while the current content is linked with solid arrows to the respective source partitions. However, the query view of Eq(1) defined for the target table of FIG. 3A may need to be adapted to select current records of the target table as shown in FIG. 3B. For that, the query view may be changed in step 203 to select the records of the load target partitions $TP_{1,v_1}^L \ldots TP_{N,v_1}^L$. Following the above example, the WHERE clause may be changed as follows:

CREATE OR REPLACE VIEW <view-name>
FROM <target-table> WHERE $ID \leq ID_{N,v_1}^L$
AND ID NOT IN $(ID_{1,v_0}^L \ldots ID_{N,v_0}^L, ID_1^R \ldots ID_K^R)$      Eq(2).

That is, the last content having version $v_0$ is deselected and the content of version $v_1$ is selected.

Figure 3C:
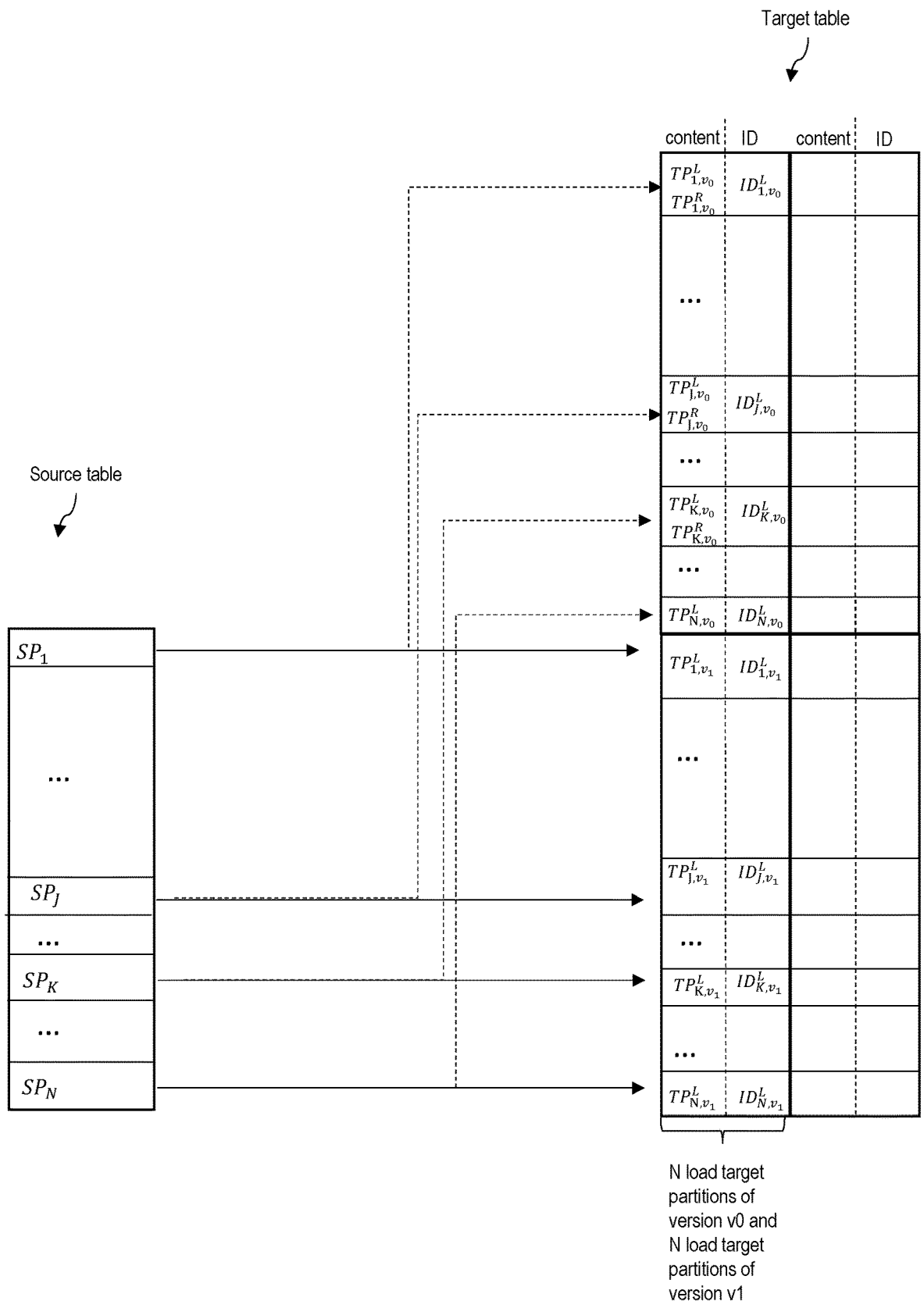

The update program may be executed in step 205 to assign records of the replication target partitions having IDs $ID_1^R, \ldots ID_K^R$ respectively to the load target partitions having the IDs $ID_{1,v_0}^L \ldots ID_{K,v_0}^L$. This is performed to avoid storing inconsistent data, because the replication program (if executed) in accordance with its default mode may copy new records in these partitions having $ID_1^R, \ldots ID_K^R$. The update program may, for example, comprise a SQL update statement as follows: UPDATE <table> SET $ID=ID_{1,v_0}^L \ldots ID_{K,v_0}^L$ WHERE $ID=ID_1^R, \ldots ID_K^R$ respectively. The resulting target table after the update program execution ends is shown in FIG. 3C, where, for example, the load target partition associated with the source partition $SP_1$ comprises the content $TP_{1,v_0}^L$ and $TP_{1,v_0}^R$.

A replication request may be received in step 207. The replication request includes one or more changed records of one or more source partitions $SP_1 \ldots SP_J$ of the K source partitions $SP_1 \ldots SP_K$, where 1≤J≤K that have been changed or inserted. This may require executing the replication program for these J source partitions $SP_1 \ldots SP_J$. To that end, step 209 comprises determining (step 209) whether the execution of the update program is finished.

Figure 3D:
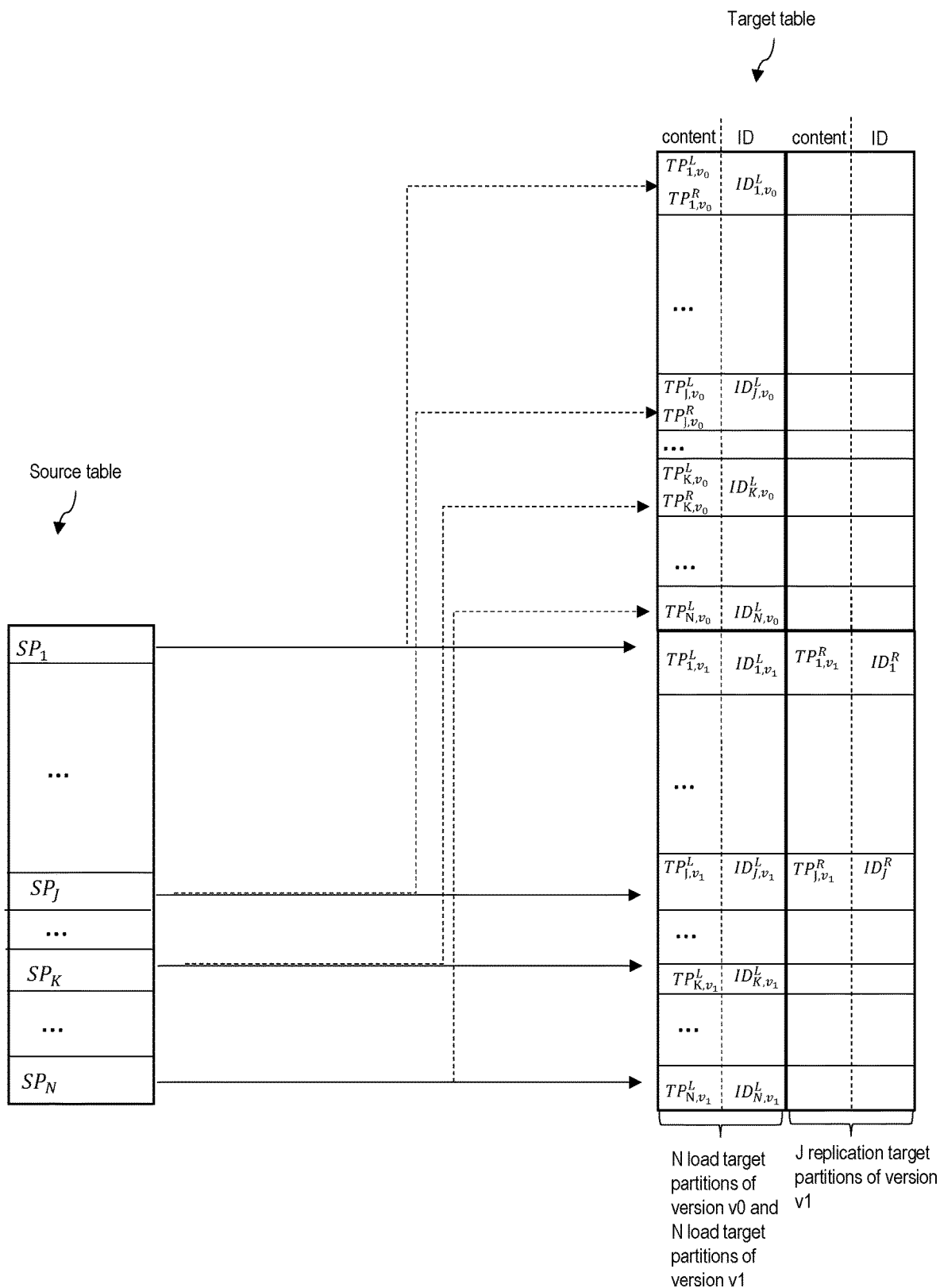

If the execution of the update program is finished, the replication program may be executed in step 211 in accordance with the default mode of operation for copying the changed records of the J source partitions $SP_1 \ldots SP_J$ in the respective replication target partitions having IDs $ID_1^R, \ldots ID_J^R$ respectively. The status of the resulting target table is shown in FIG. 3D. The content of the changed records of the source partition $SP_i$ (where i=1, ... J) is indicated by $TP_{i,v_1}^R$. Again, the query view of equation Eq(2) may be changed or updated in step 213 to the current content of the target table as shown in FIG. 3D, which is indicated by the version number $v_1$. The change may be performed to cancel the deselection of IDs $ID_1^R, \ldots ID_K^R$ so that the query view becomes:

CREATE OR REPLACE VIEW <view-name>
FROM <target-table> WHERE $ID \leq ID_{N,v_1}^L$
AND ID NOT IN $(ID_{1,v_0}^L \ldots ID_{N,v_0}^L)$      Eq(3).

The query view may, for example, be updated before the execution of the replication program starts. The execution of the replication program may start after the still running queries against the query view of equation Eq(2) have been completed. The replication program may, for example, comprise an insert command for inserting the changed records in a replication view which is the query of view of equation Eq(3). FIG. 3D shows the status of the target table after the replication program is finished, wherein the update program is finished before the replication program starts. FIG. 3C shows the status of the target table after the update program is finished, but before the replication program starts.

Figure 3E:
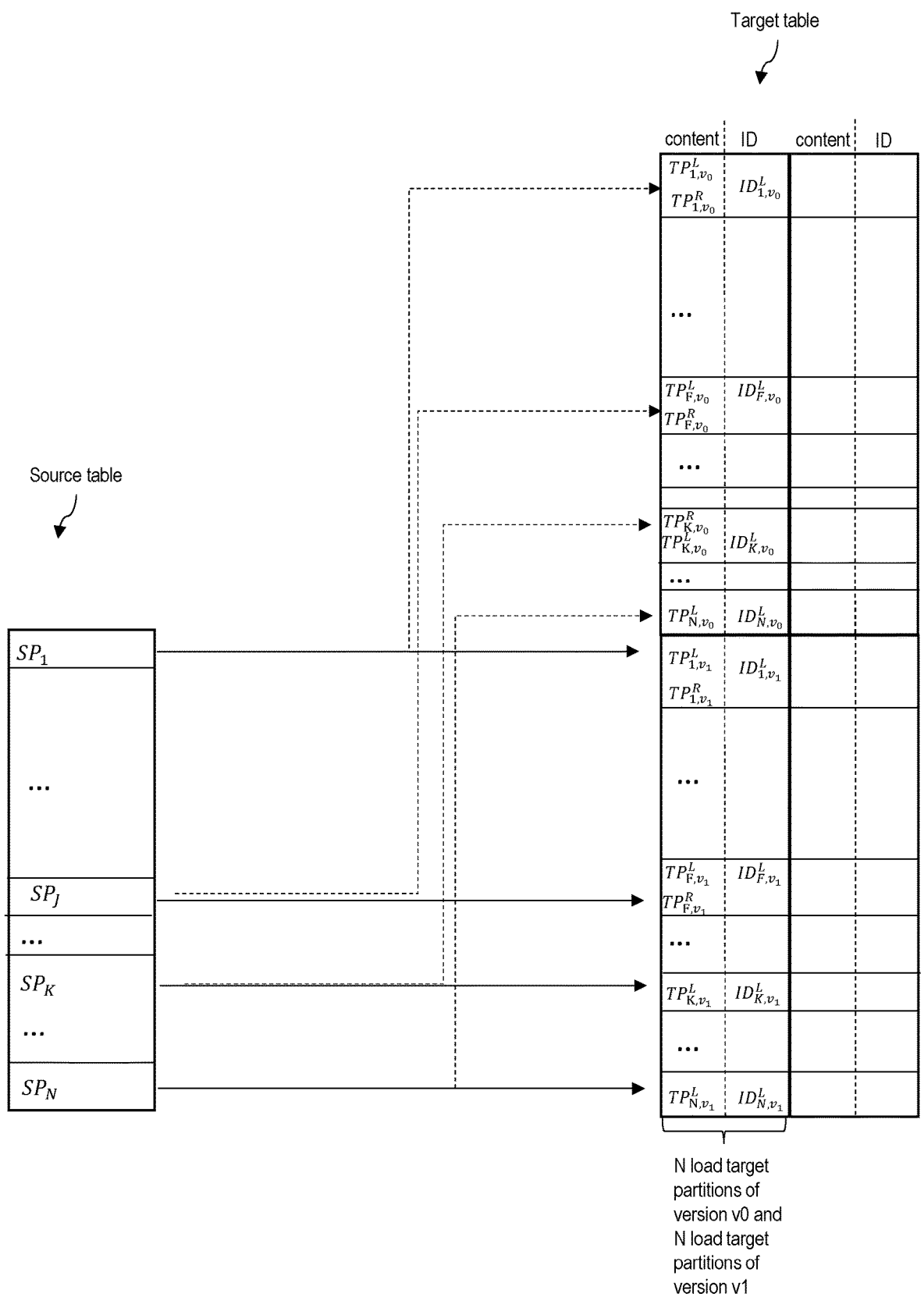
Figure 3F:
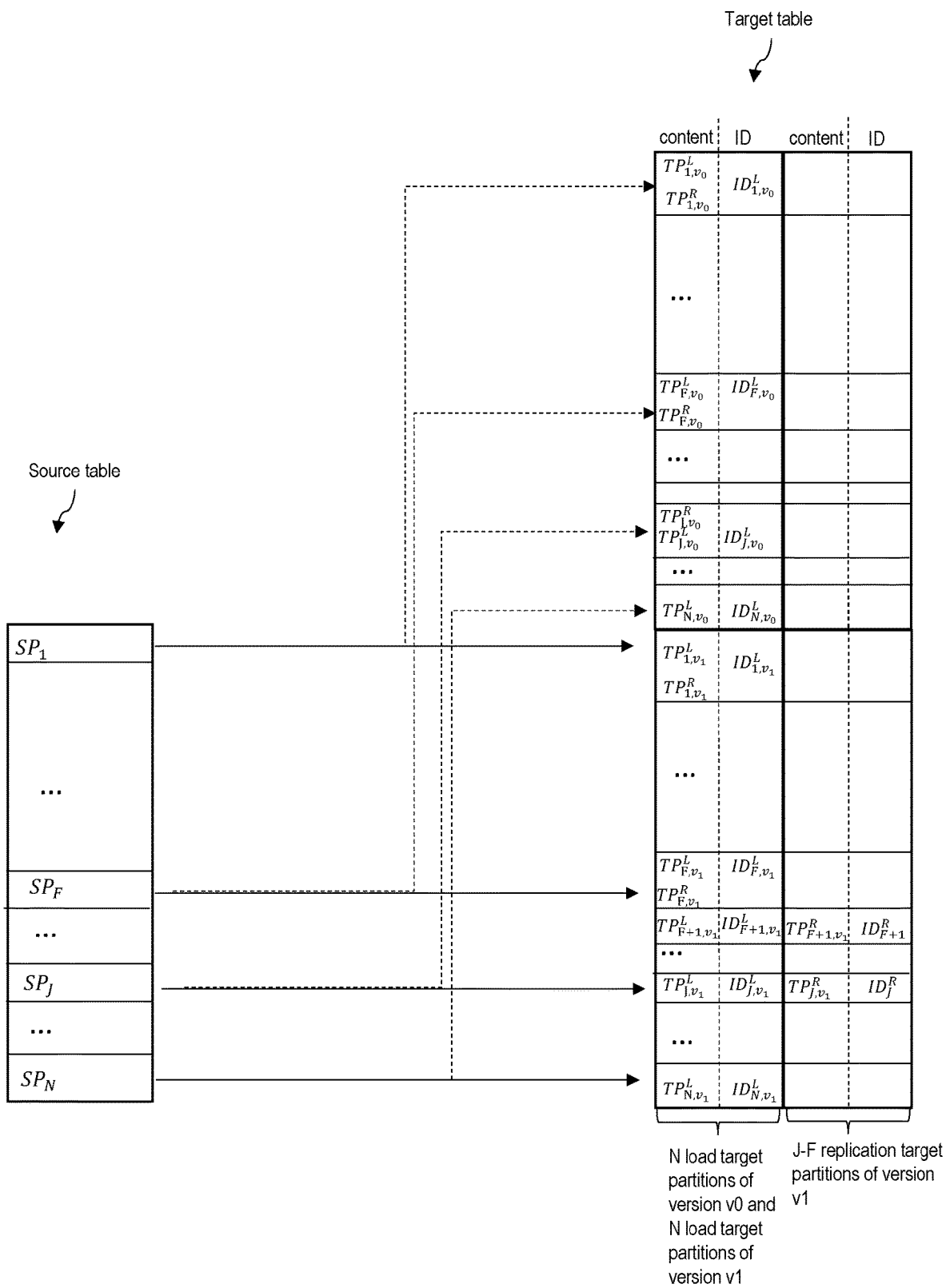
Figure 3G:
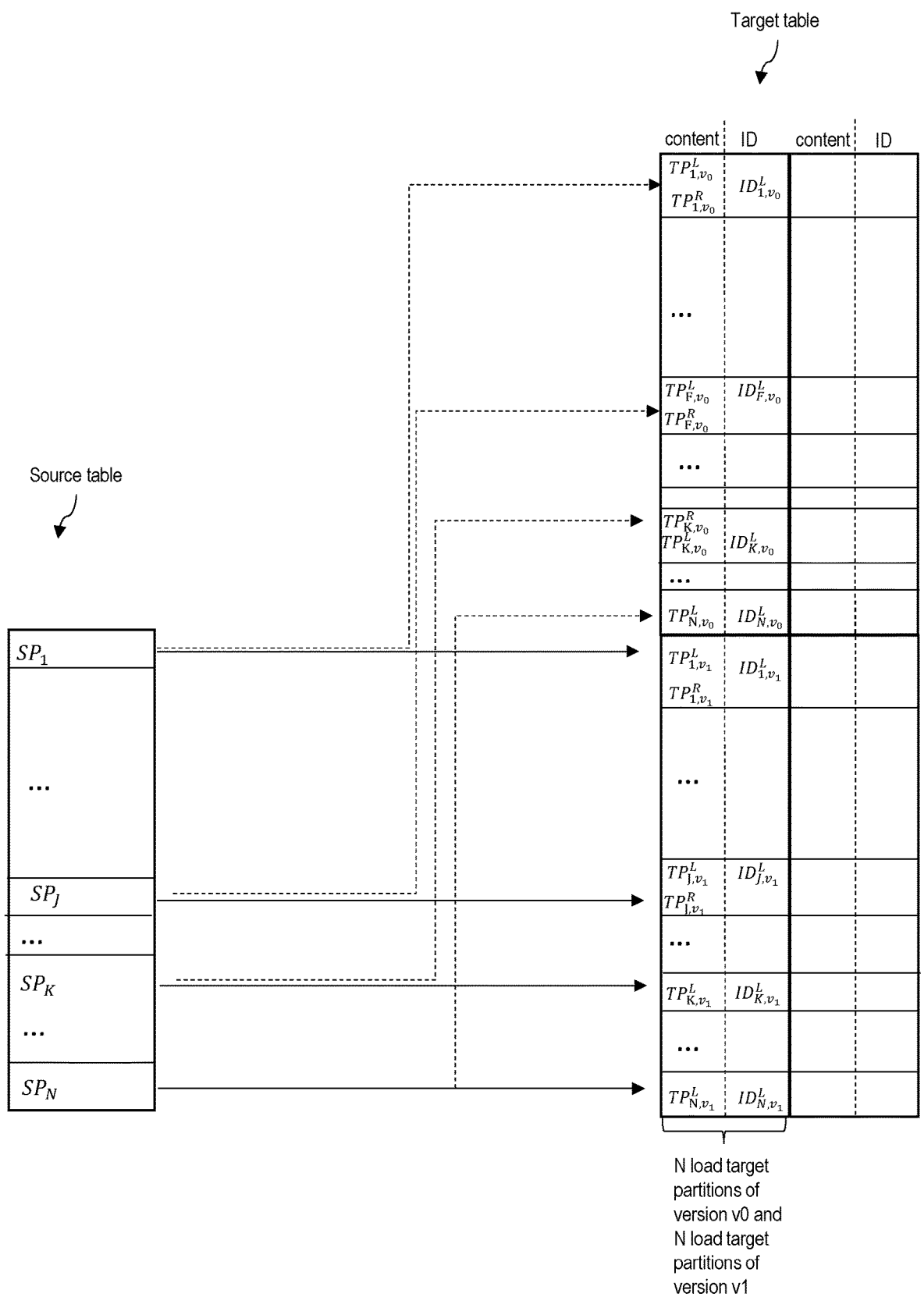

If the execution of the update program is not yet finished, the replication program may be executed in step 215 in accordance with the second mode of operation to copy (directly or indirectly) the changed records of the J source partitions $SP_1 \ldots SP_J$ respectively in the load target partitions having IDs $ID_{1,v_1}^L \ldots ID_{J,v_1}^L$. However, the replication of the records of the J source partitions $SP_1 \ldots SP_J$ may or may not end before the end of the update program. FIGS. 3E and 3F show the status of the target table of FIG. 3B in case the replication is not completed before the end of the update program. FIG. 3E shows the intermediate state of the target table and FIG. 3F shows the final state of the target table. FIG. 3E shows the status of the target table after the execution of the update program and of the execution of the replication in accordance with the second mode of operation. FIG. 3F shows the status of the target table after the completion of the execution of the update program and of the execution of the replication in accordance with both the default and the second mode of operation. FIG. 3G shows the status of the target table in case the replication is completed before the end of the update program.

Consider a case in which the update program is finished while the execution of the replication program in accordance with the second mode of operation is not finished e.g., only part of the target partitions (e.g., F target partitions $TP_{1,v_1}^R \ldots TP_{F,v_1}^R$) have been copied to the respective load target partitions having IDs, $ID_{1,v_1}^L \ldots IN_{1,v_1}^L$ before the end of the update program. In this case, upon completion of the update program, the replication program may be switched back to the default mode of operation to copy the rest of the changed records of the source partitions $SP_{F+1} \ldots SP_J$ in the replication target partitions having IDs $ID_{F+1}^R, \ldots ID_J^R$. The resulting target table is indicated in FIG. 3F. In this case, the query view of equation Eq (2) may be updated to obtain the query view of Eq (3) to select the records of version $v_1$ of the target table of FIG. 3F and newly inserted rows by the replication program in accordance with the default mode of operation are visible.

In case the execution of the replication program in accordance with the second mode of operation is finished before the end of the update program, J target partitions $TP_{1,v_1}^R \ldots TP_{J,v_1}^R$ have been copied to the respective load target partitions having IDs, $ID_{1,v_1}^L \ldots ID_{J,v_1}^L$. The resulting target table is indicated in FIG. 3G. In this case, the query view of Eq(2) may still be used as it would select the records of version $v_1$ of the target table of FIG. 3G.

As described above, the execution of the replication program may or may not require a change of the (initial) query view of equation Eq(2). In case the query view of equation Eq(2) has to be adapted, the replication program may only start after all still running queries against the query view of equation Eq(2) have completed.

Figure 4:
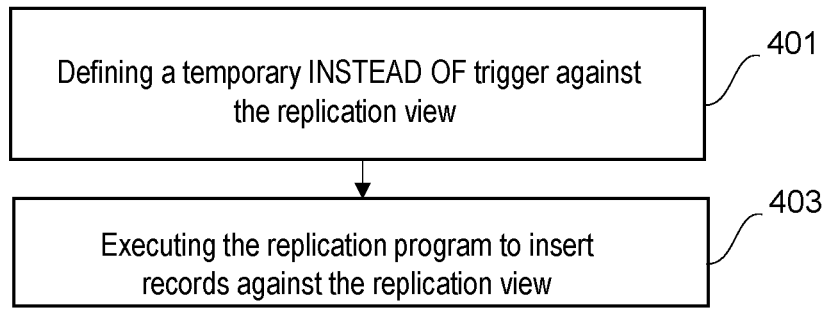
FIG. 4 is a flowchart of a method for executing the replication program in accordance with the second mode of operation.

FIG. 4 is a flowchart of a method for executing the replication program in accordance with the second mode of operation. The method of FIG. 4 provides an example implementation of step 215 of FIG. 2. For the purpose of explanation, the method described in FIG. 4 may be implemented in the system illustrated in FIG. 1, but is not limited to this implementation. The method of FIG. 4 may, for example, be performed by the target database system 103. A replication view may be defined for the target table of FIG. 3B as follows:

```
CREATE VIEW <replication-view> AS
  SELECT * FROM <target-table> WHERE ID ≤ ID_{N,v_1}^L AND ID NOT
    IN (ID_{1,v_0}^L ... ID_{N,v_0}^L, ID_1^R,... ID_K^R).
```

The replication view comprises the query view of equation Eq(2). They may be provided separately because the replication view may further be adapted (e.g., using the trigger as defined in this method) for execution for the replication program but the normal queries would not need that adaptation and thus they can be executed against the query view.

The replication program may comprise an insert command for inserting changed records in the replication view. For example, the insert command may be a SQL INSERT statement against the replication view as follows:

INSERT INTO <replication-view> $(ID_1^R, \ldots ID_J^R)$
  VALUES $(ID_1^S, \ldots ID_J^S)$.

This statement specifies the names of the replication target partitions and the values to be inserted which are the changed records of the source partitions $SP_1 \ldots SP_J$ having source partition IDs $ID_1^S, \ldots ID_J^S$ respectively. The execution of the replication program in accordance with the default mode of operation or second mode of operations comprises execution of the insert command. The replication view is adapted differently for the default and second mode of operations.

The present method may further enable to switch between the default mode of operation and the second mode of operation. For that, a trigger such as a temporary INSTEAD OF trigger may be defined in step 401 against the replication view. The trigger may be a database object that is associated with the replication view, and that activates when the replication program starts while the update program is not finished. The trigger may only be needed as long as the update program has not yet completed. As soon as it is finished and committed, the trigger may be dropped. Thus, no long-term negative performance impact may be incurred. Furthermore, there may be no performance impact for queries—the trigger exists only on the replication-specific view, which may not be used for queries. The INSTEAD OF trigger may, for example, be defined as follows:

```
CREATE TRIGGER <trigger-name> INSTEAD OF INSERT ON
<replication-view>
  REFERENCING NEW AS n
  FOR EACH ROW
    SET n.partitionID = CASE n.partitionID WHEN ID_i^S THEN ID_{i,v_1}^L
    ELSE n.partitionID END, where i = 1 ...J.
```

The execution of the replication program in step 403 may comprise the execution of the defined insert command against the replication view. While the update program is not yet finished, the replication program may be executed in accordance with the second mode of operation using the trigger. The target database system may, for example, receive the insert command e.g., the SQL INSERT statement. The target database system may parse and compile the insert command into some internal representation. During that phase, the target database system may check for the existence of the replication view. The target database system may, for example, further check whether the user doing the insert command has the necessary privileges. Additionally, the target database system may know about the trigger on the replication view. Thus, the trigger is compiled into the statement's internal representation. In particular, this compiling into the statement's internal representation may lead to the inclusion of the additional above SET statement of the trigger. When the internal representation is subsequently processed, the values to be inserted are taken first, then the SET statement (originally from the trigger) is processed, and finally the values will be inserted into the target table, i.e., the base table on which the replication view is built. Thus, in the second mode of operation, the replication program continues to use the partitions with IDs, $ID_1^R, \ldots ID_J^R$—but the trigger effectively changes the semantics to replace $ID_1^R, \ldots ID_J^R$ with $ID_{1,v_1}^L \ldots ID_{J,v_1}^L$ respectively to copy directly the changed records of the J source partitions $SP_1 \ldots SP_J$ respectively in the load target partitions having IDs $ID_{1,v_1}^L \ldots ID_{J,v_1}^L$. However, the replication program is oblivious to those changes. The target database system handles it transparently. This method uses the mapped partition IDs $ID_{1,v_1}^L \ldots ID_{J,v_1}^L$ that were used by the partial reload at time $t_1$. That may come with the significant advantage that the rows inserted by replication using partition IDs $ID_{1,v_1}^L \ldots ID_{J,v_1}^L$ may not require any post-processing. But it is also possible to use some other unique target partition ID different from $ID_{1,v_1}^L \ldots ID_{J,v_1}^L$. It may merely be required that the target partition ID must not have been visible before the partial reload. Any queries that started before the partial reload do not suddenly see rows that replication program generates after the partial reload has finished.

Figure 5:
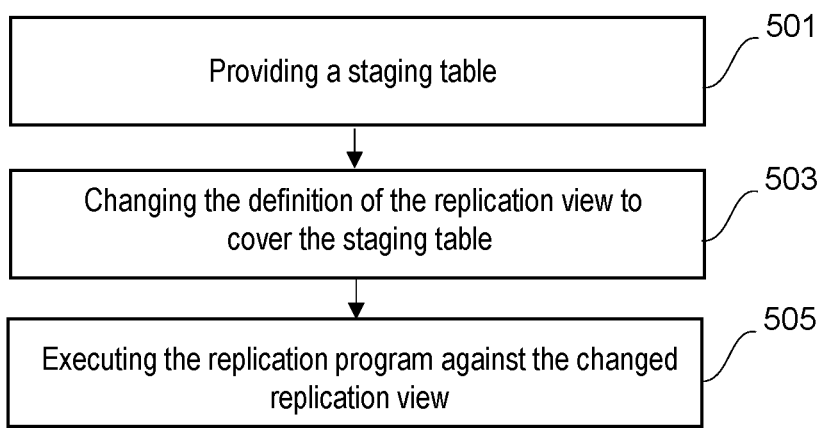
FIG. 5 is a flowchart of a method for executing the replication program in accordance with the second mode of operation.

FIG. 5 is a flowchart of a method for executing the replication program in accordance with the second mode of operation. The method of FIG. 5 provides an example implementation of step 215 of FIG. 2. For the purpose of explanation, the method described in FIG. 5 may be implemented in the system illustrated in FIG. 1, but is not limited to this implementation. The method of FIG. 5 may, for example, be performed by the target database system 103. A replication view may be defined for the target table as shown in FIG. 3B as follows:

```
CREATE VIEW <replication-view> AS
  SELECT * FROM <target-table>
  WHERE ID ≤ ID_{N,v_1}^L
  AND ID NOT IN (ID_{1,v_0}^L ... ID_{N,v_0}^L, ID_1^R,... ID_K^R).
```

The method of FIG. 5 describes an alternative approach to the method of FIG. 4. No trigger is used on the replication view. Instead, a separate table (named staging table) is provided in step 501 for enabling a (indirect) copy of the changed records of the J source partitions $SP_1 \ldots SP_J$ respectively in the load target partitions having IDs $ID_{1,v_1}^L \ldots ID_{J,v_1}^L$ via the staging table.

In step 503, the definition of the replication view may be changed to cover the staging table as follows:

```
CREATE VIEW <replication-view> AS
  SELECT * FROM <target-table>
  WHERE ID < ID_{N,v_1}^L AND ID NOT IN (ID_{1,v_0}^L ... ID_{N,v_0}^L, ID_1^R,... ID_K^R)
UNION ALL
  SELECT * FROM <staging-table>
```

The staging table may be used to hold all newly replicated rows for the just reloaded partition. All new replicated rows for source partition IDs $ID_1^S, \ldots ID_J^S$ may be placed into that staging table. An insert command (e.g., INSERT statement) may be defined for inserting changed records in the changed replication view. The execution of the replication program in accordance with the second mode of operation comprises the execution of the insert command. As with the previous methods of FIGS. 3 and 4, the replication program does not behave differently between the default mode of operation and the second mode of operation. The copy of source partitions is completely transparent to the replication program. The different behaviour is in the target database system. The target database system knows how the replication view is defined. From that replication view definition, it can derive that all rows having partition ID $ID_i^R$ shall be stored in the staging table. Hence, the internal compiled representation of the INSERT statement of the replication program will use the staging table as target.

The query view of equation Eq(2) may also be adapted in the same way as with the replication view to cover the staging table. This may make newly replicated rows available for new queries. Due to the definition of the view, the database system may be able to determine that all rows with partition ID $ID_1^R, \ldots ID_J^R$ are in the staging table whereas all other rows are in the regular table. That knowledge may be exploited when the INSERT statement against the replication view is run in step 505, e.g., the database system inserts the changed records with source partition IDs $ID_1^S, \ldots ID_j^S$ into the staging table itself. This may be completely transparent to the replication process.

After the update program is completed, the usage of the staging table may be phased out in order to restore the normal replication performance and the default mode of operation. For that, it may be necessary to move all rows in the staging table to the target table. A combined INSERT/DELETE statement may be used because all other approaches (with multiple SQL statements) can result in incorrect results for concurrently running queries.

```
INSERT INTO <target-table>
SELECT CASE ID WHEN ID_i^R THEN ID_{i,v_1}^L ELSE ID END, *, where
i = 1 ... K
FROM OLD TABLE (DELETE FROM <staging-table>)
```

Note that the data movement via the described INSERT/DELETE may not use partition ID $ID_i^R$ for the moved rows since they are filtered out by the WHERE clause of the replication view. It is possible that new rows are created by replication concurrently to this data movement. Therefore, the INSERT statement of the above combined INSERT/DELETE statement may have to be repeated several times. However, in the end it may be necessary to briefly suspend replication for the table to move the final rows. An alternative may be to change the query view definition by removing the "NOT IN ($ID_1^R, \ldots ID_K^R$)" for the union-all-leg for the regular table. That may make it ambiguous where rows with partition ID $ID_1^R, \ldots$ or $ID_K^R$ shall be inserted so that an INSTEAD OF trigger may be required to direct all INSERTs to the regular table while executing all DELETEs against both the regular table and the staging table.

Figure 6:
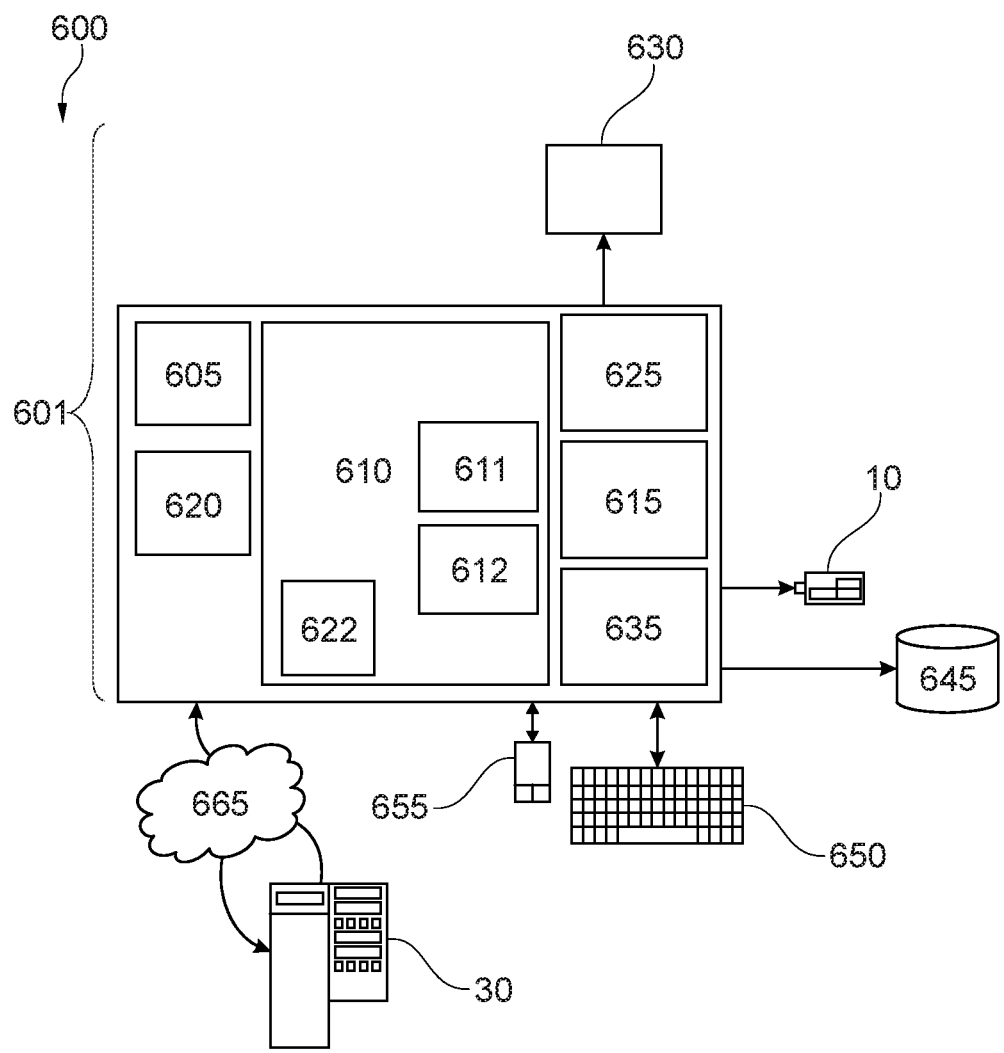
FIG. 6 represents a computerized system, suited for implementing one or more method steps as involved in the present subject matter.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions. The processor 605 may for instance be a multi-core processor.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes instructions 612 e.g., instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program, executable program (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (WLAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage. For example, the program code that implements the present method may be on one or more computer readable storage media. The system 600 may, for example, comprise the target database system 103 or the source database system 101. The present computer program code/method may, for example, be running/carried out on one or more processors, in particular on processors of different systems such as the source and target database systems. The one or more processors may receive the elements of the program code/method as instructions.

The present invention may be a system, a method, and/or a computer program product at any possible technical detail level of integration. The computer program product may include a computer readable storage medium (or media) having computer readable program instructions thereon for causing a processor to carry out aspects of the present invention. A 'processor' as used herein encompasses an electronic component which is able to execute a program or machine executable instruction or computer executable code. The processor may for instance be a multi-core processor. A processor may also refer to a collection of processors within a single computer system or distributed amongst multiple computer systems. The computer executable code may be executed by multiple processors that may be within the same computing device or which may even be distributed across multiple computing devices.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for data synchronization between a source database system and a target database system, the method comprising:
   identifying a query view of the target database system, the query view enabling access to a last version of a first source table of the source database system that is stored in a first target table of the target database system via querying the query view, the query view being configured to select records of the first target table, the first target table having a first load target partition with a first load partition identifier (ID) and a first replication target partition with a first replication partition ID;

executing a load program for a current version of a first source partition of the first source table, wherein executing the load program includes loading the first source partition in a second load target partition of the first target table, the second load target partition having a second load partition ID;

changing the query view to select records of the first target table having the second load partition ID;

executing an update program for assigning records of the first replication target partition to the first load target partition;

in response to receiving a replication request of one or more current records of the first source partition of the first source table, determining whether the execution of the update program is finished;

selecting a mode of operation for a replication program based, at least in part, on determining whether the execution of the update program is finished;

executing the replication program in accordance with the selected mode of operation; and changing the query view to further select the records of the first replication target partition.

2. The computer implemented method of claim 1, wherein selecting the mode of operation for the replication program comprises selecting a default mode of operation to copy the records in the first replication target partition responsive to determining that the execution of the update program is finished.

3. The computer implemented method of claim 2, wherein the replication program is configured, in accordance with the default mode of operation, to:

copy changed records of a source partition; and associate said source partition with one or more load target partitions and a replication target partition.

4. The computer implemented method of claim 1, wherein the target database system comprises the first target table associated with the first source table of the source database system, the first source table comprising at least one source partition, and wherein a current version of the source partition is stored in the first load target partition and the first replication target partition of the first target table using the load program and the replication program respectively, the first load target partition having a unique first load partition ID and a unique first replication partition ID.

5. The computer implemented method of claim 2, further comprising providing a replication view comprising the query view, the replication program comprising an insert command against the replication view for insertion of the records, wherein executing the replication program in accordance with the default mode of operation is performed by changing the replication view.

6. The computer implemented method of claim 1, wherein selecting the mode of operation for the replication program comprises selecting an alternate mode of operation to copy the records in a given target partition of the first target table responsive to determining that the update program is not finished.

7. The computer implemented method of claim 6, the given partition being the second load target partition.

8. The computer implemented method of claim 6, wherein executing the replication program in accordance with the alternate mode of operation to copy the records in the given target partition comprises:

storing the records in a staging table different from the first target table; and changing the query view to further select the records of the staging table.

9. The computer implemented method of claim 8, further comprising:

in response to the update program completing, moving the staging table to the given partition of the first target table.

10. The computer implemented method of claim 6, the given partition being different from the second load partition and the first load target partition, the method further comprising changing the query view to further select the records of the given partition.

11. The computer implemented method of claim 6, wherein executing the replication program in accordance with the alternate mode of operation to copy the records in the second load target partition comprises:

implementing a trigger to switch from a default mode of operation of the replication program to the alternate mode of operation, wherein the trigger comprises an SQL INSTEAD OF trigger to skip the copy of the records to the first replication target partition and execute another command defined in the trigger to copy the records in the second load target partition, the trigger being activated in response to determining that the update program is not finished.

12. The computer implemented method of claim 11, further comprising:

in response to determining that the update program is finished:

deleting the trigger, and completing the execution of the replication program in accordance with the default mode of operation.

13. The computer implemented method of claim 1, wherein changing the query view further comprises deselecting the first load partition ID and the first replication partition ID, wherein executing the replication program in accordance with the selected mode of operation is performed after queries using the first changed query view have finished.

14. The computer implemented method of claim 1, wherein the query view comprises a selection of records having an ID smaller than a maximum load partition ID of the load partition IDs.

15. The method of claim 1, wherein the load program is configured to:

load one or more distinct versions of a source partition of a source table of a source database system into a respective distinct target partition of a corresponding target table of a target database system, the respective distinct target partition having a unique load partition ID.

16. A computer program product for data synchronization between a source database system and a target database system, the computer program product comprising:

one or more computer readable storage media and program instructions stored on the one or more computer readable storage media, the program instructions comprising instructions to:

identify a query view of the target database system, the query view enabling access to a last version of a first source table of the source database system that is stored in a first target table of the target database system via querying the query view, the query view being configured to select records of the first target table, the first target table having a first load target partition with a first load partition identifier (ID) and a first replication target partition with a first replication partition ID;

execute a load program for a current version of a first source partition of the first source table, wherein executing the load program includes loading the first source partition in a second load target partition of the first target table, the second load target partition having a second load partition ID;

change the query view to select records of the first target table having the second load partition ID;

execute an update program for assigning records of the first replication target partition to the first load target partition;

in response to receiving a replication request of one or more current records of the first source partition of the first source table, determine whether the execution of the update program is finished;

select a mode of operation for a replication program based, at least in part, on determining whether the execution of the update program is finished;

execute the replication program in accordance with the selected mode of operation; and change the query view to further select the records of the first replication target partition.

17. The computer program product of claim 16, wherein the instructions to select the mode of operation for the replication program comprise instructions to select an alternate mode of operation to copy the records in a given target partition of the first target table responsive to determining that the update program is not finished.

18. The computer program product of claim 16, wherein the instructions to select the mode of operation for the replication program comprise instructions to selecting a default mode of operation to copy the records in the first replication target partition responsive to determining that the execution of the update program is finished.

19. A computer system comprising:
one or more computer processors;
one or more computer-readable storage media; and
program instructions stored on the computer-readable storage media for execution by at least one of the one or more processors, the program instructions comprising instructions to:

identify a query view of a target database system, the query view enabling access to a last version of a first source table of a source database system that is stored in a first target table, the query view being configured to select records of the first target table of the target database system via querying the query view, the first target table having a first load target partition with a first load partition identifier (ID) and a first replication target partition with a first replication partition ID;

execute a load program for a current version of a first source partition of the first source table, wherein executing the load program includes loading the first source partition in a second load target partition of the first target table, the second load target partition having a second load partition ID;

change the query view to select records of the first target table having the second load partition ID;

execute an update program for assigning records of the first replication target partition to the first load target partition;

in response to receiving a replication request of one or more current records of the first source partition of the first source table, determine whether the execution of the update program is finished;

select a mode of operation for a replication program based, at least in part, on determining whether the execution of the update program is finished;

execute the replication program in accordance with the selected mode of operation; and change the query view to further select the records of the first replication target partition.

20. The computer system of claim 19, wherein the instructions to select the mode of operation for the replication program comprise instructions to select an alternate mode of operation to copy the records in a given target partition of the first target table responsive to determining that the update program is not finished.

* * * * *